United States Patent

Yamamoto et al.

[11] Patent Number: 4,700,221
[45] Date of Patent: Oct. 13, 1987

[54] POWER CONTROL CIRCUIT FOR A COLOR ENCODER OF A VIDEO CAMERA

[75] Inventors: Isamu Yamamoto; Masao Naito, both of Kanagawa, Japan

[73] Assignee: Sony Corporation, Tokyo, Japan

[21] Appl. No.: 866,408

[22] Filed: May 23, 1986

[30] Foreign Application Priority Data

May 24, 1985 [JP] Japan .................................. 60-111580
Jul. 12, 1985 [JP] Japan ............................. 60-106594[U]

[51] Int. Cl.[4] .......................... H04N 9/07; H02B 1/24; H01H 3/34
[52] U.S. Cl. ...................... 358/44; 358/906; 358/43; 307/34; 307/112; 307/116; 307/141.4
[58] Field of Search ...................... 358/44, 41, 43, 906; 307/31, 34, 112, 116, 125, 130, 140, 141.4

[56] References Cited

U.S. PATENT DOCUMENTS

| | | | |
|---|---|---|---|
| 3,931,636 | 1/1976 | Schneider | 358/50 |
| 4,386,376 | 5/1983 | Takimoto et al. | 358/906 |
| 4,507,690 | 3/1985 | Azuma et al. | 358/906 |

Primary Examiner—James J. Groody
Assistant Examiner—Robert M. Bauer
Attorney, Agent, or Firm—Hill, Van Santen, Steadman & Simpson

[57] ABSTRACT

A power control circuit for a color encoder of a video camera having a camera head portion, a signal processing circuit for generating a luminance signal and a chrominance signal, a color encoder supplied with the luminance signal and the chrominance signal and for generating a composite video signal, and an external output terminal at which the composite video signal is obtained includes a power switch for controlling the power supply to the color encoder, a comparator connected to the external output terminal and for comparing the level of a synchronizing signal at the external output terminal with a reference level and a control circuit supplied with the output of the comparator and for controlling the power switch such that the power switch is turned on when the external output terminal is terminated.

7 Claims, 13 Drawing Figures

| Mode | a,h | b | c | c' | d | e | f | g | Switch 15 |
|---|---|---|---|---|---|---|---|---|---|
| Terminated | a>h | L | L | H | H | L | L | H | ON |
| | | | | | H | | H | | |
| Not Terminated | a<h | Positive Pulse | H | L | H | H | L | H | ON |
| | | H | L | | L | | H | L | OFF |

FIG. 5A
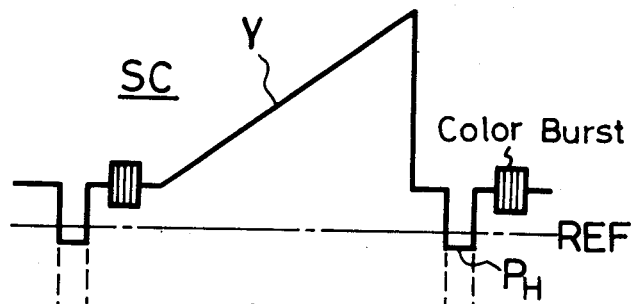
FIG. 5B
FIG. 5C
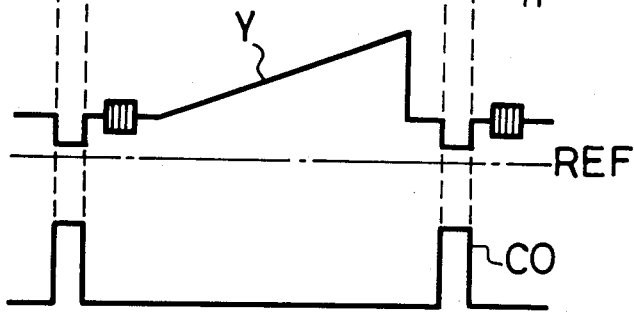
FIG. 6
FIG. 7
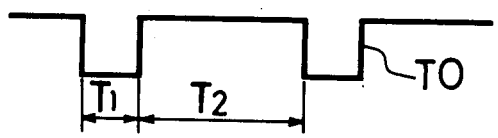
| Mode | a,h | b | c | c' | d | e | f | g | Switch 15 |
|---|---|---|---|---|---|---|---|---|---|
| Terminated | a>h | L | L | H | H | L | L | H | ON |
|  |  |  |  |  | H |  | H |  |  |
| Not Terminated | a<h | Positive Pulse | H | L | H | H | L | H | ON |
|  |  | H | L |  | L |  | H | L | OFF |

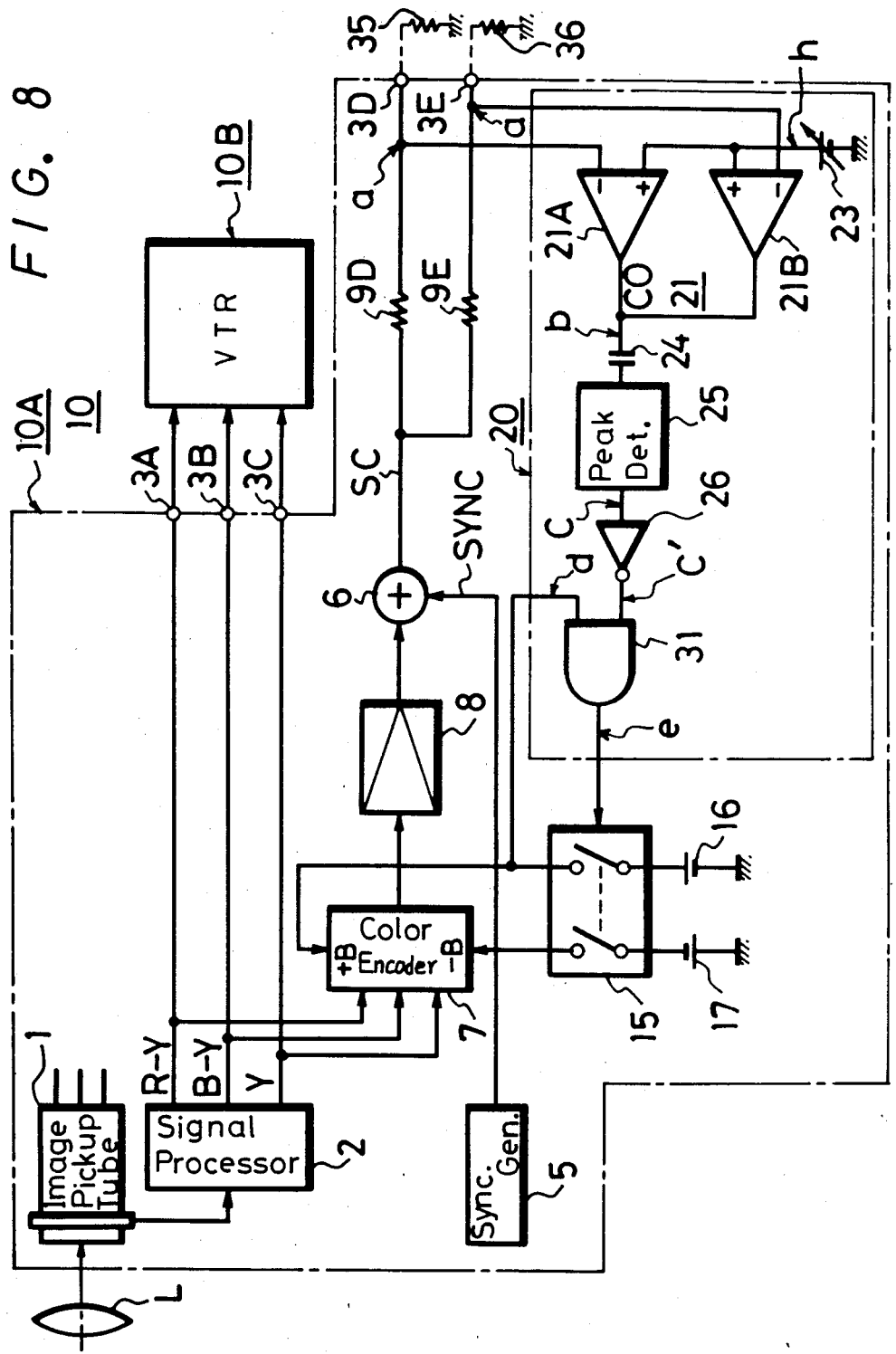

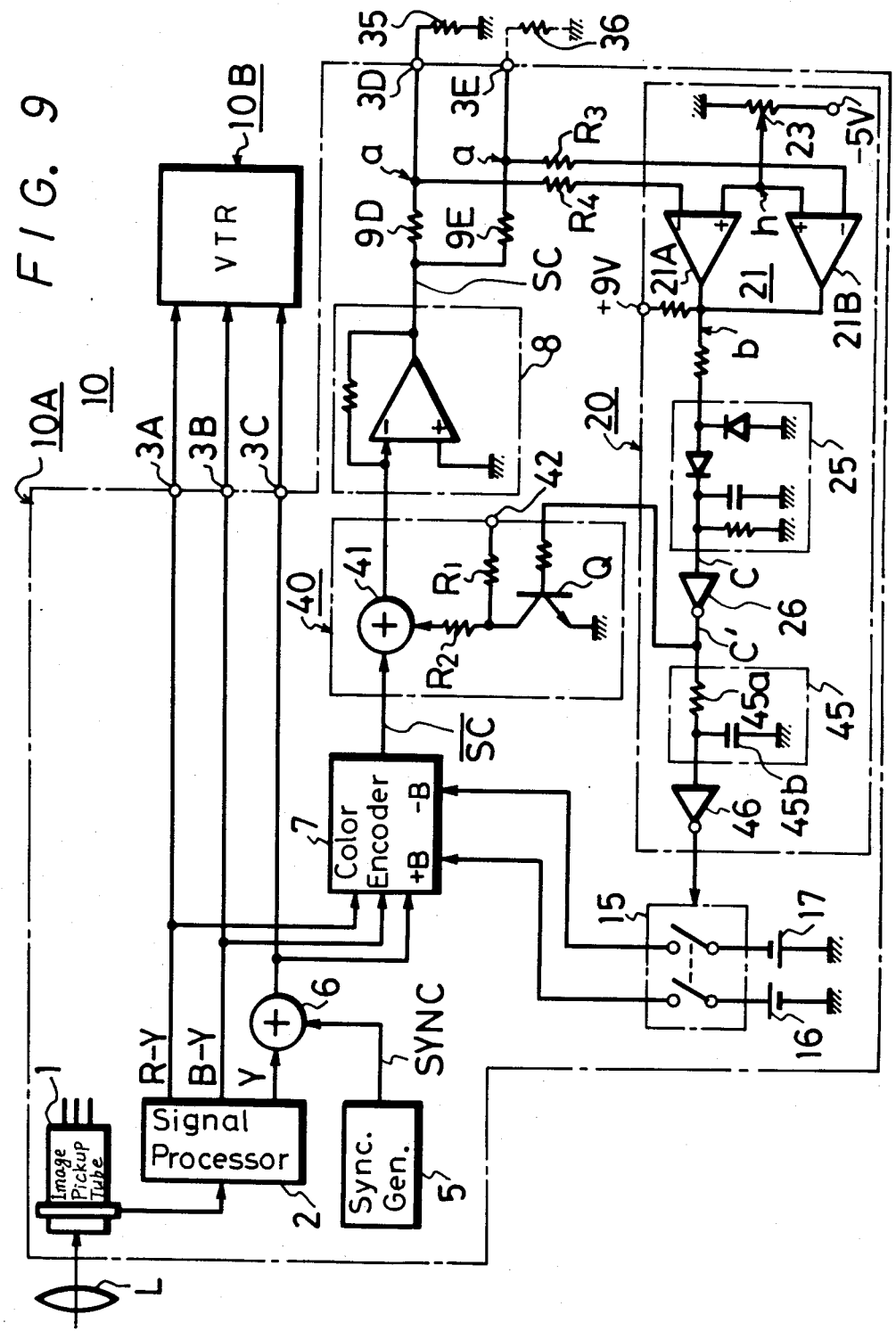

FIG. 10

| State | Terminated State of Terminal 3D(3E) | Level (Volt) at Point a SYNC | Level (Volt) at Point a video | Level (Volt) at Point a DC | Level at Point b | Level at Point c' | Transistor Q | Power Switch 15 |
|---|---|---|---|---|---|---|---|---|
| I | Terminated | -0.3 | 0.7 | 0 | L | H | ON | ON |
| II | Terminated→Not Terminated | -0.6 | 1.4 | 0 | Positive Pulse | L | OFF | ON |
| II' | Not Terminated | -0.6 | 1.4 | -0.6 | H | L | OFF | OFF |
| III | Not Terminated | 0 | 0 | -0.6 | H | L | OFF | OFF |
| IV | Not Terminated→Terminated | 0 | 0 | -0.3 | L | H | ON | OFF |
| IV' | Terminated | 0 | 0 | 0 | L | H | ON | ON |
| V | Terminated | -0.3 | 0.7 | 0 | L | H | ON | ON |

DC; DC offset Voltage

POWER CONTROL CIRCUIT FOR A COLOR ENCODER OF A VIDEO CAMERA

BACKGROUND OF THE INVENTION

1. Field of the Invention

This invention relates generally to a video tape recorder (VTR) having a built-in camera and more particularly is directed to a power control circuit for a color encoder of a video camera for generating a video signal of the standard system.

2. Description of the Prior Art

In a video tape recorder having a built-in camera in which a luminance signal and a chrominance signal are respectively recorded on separate channels simultaneously, there is frequently employed such a recording system as shown in FIGS. 1A and 1B.

According to the recording system shown in FIGS. 1A and 1B, of a luminance signal and a chrominance signal derived from a television camera, a chrominance signal, for example, a pair of color difference signals $R-Y$ and $B-Y$ are respectively time-base-compressed to $\frac{1}{2}$ of the normal ones. Also, a time division compressed color difference signal C, which results from time-dividing and frequency-multiplexing the pair of these color difference signals $R-Y$ and $B-Y$ as shown in FIG. 1B, and a luminance signal Y are simultaneously recorded on adjacent tracks as shown in FIG. 2.

In FIGS. 1A and 1B, reference letter $P_H$ designates a horizontal synchronizing pulse and reference letters $P_Y$ and $P_C$ designate reference pulses used for adjusting the time base, respectively.

FIG. 3 schematically shows one example of a circuit arrangement of the prior art video tape recorder having a built-in camera which employs such recording system.

In FIG. 3, reference letter 10 generally designates a built-in camera type VTR which comprises a televsion or video camera section 10A and a VTR (built-in type VTR) 10B. The VTR 10B is freely detachable from the video camera section 10A. An object is projected through a lens L to an image pickup device (image pickup tube or image pickup element using semiconductors, such as, CCDs (charge coupled devices) and the like). In this case, the object is projected onto the image pickup tube 1 for convenience sake of explanation. The image pickup signal from the image pickup tube 1 is supplied to a signal processing circuit 2 which forms, for example, a luminance signal Y and a pair of color difference signals $R-Y$ and $B-Y$.

The luminance signal Y and the pair of color difference signals $R-Y$ and $B-Y$ are delivered to output terminals 3A, 3B and 3C, respectively. To these output terminals 3A, 3B and 3C, there is detachably coupled the built-in camera type VTR 10B. Accordingly, when the VTR 10B is connected to the output terminals 3A, 3B and 3C, the color difference signals $R-Y$ and $B-Y$ with the time-base-compressed as shown in FIG. 1B together with the luminance signal Y are simultaneously recorded on the two channels.

Referring to FIG. 3, a synchronizing signal generator 5 is adapted to generate a synchronizing signal SYNC. This synchronizing signal SYNC is supplied to an adder 6 in which it is superimposed upon the luminance signal Y.

The luminance signal Y with the synchronizing signal SYNC superimposed thereon and the pair of color difference signals $R-Y$ and $B-Y$ are further supplied to a color encoder 7 which generates a standard video signal (composite television signal) SC. This video signal SC is supplied through an amplifier 8 and a matching resistor 9D (its resistance value is 75Ω) to an external output terminal 3D. In this illustrated example, in parallel to the resistor 9D, there is connected another resistor 9E from which an external output terminal 3E is led out. Thus, the two-channel arrangement is formed.

Since the standard video signal SC is developed at these external output terminals 3D and 3E, if a standard VTR (not shown) is coupled thereto, it becomes possible to record the standard video signal SC. Alternatively, if a monitor television receiver is coupled thereto, it becomes possible to monitor an image picked-up output.

By the way, in the video tape recorder having a built-in camera 10 arranged as described above, the built-in type VTR 10B and the standard VTR can be used selectively. Accordingly, even when the built-in type VTR 10B is used, while the standard VTR is not used, the operation power is incessantly supplied to the color encoder 7 provided within the video camera section 10A.

In such use, it is not necessary to supply the power to the color encoder 7. However, in the prior art VTR having a built-in camera, the color encoder 7 is incessantly powered and so, there arises a problem that the power consumption becomes large. Particularly, the power that the color encoder 7 consumes amounts to about $\frac{1}{2}$ of the whole power consumption. Therefore, how to reduce the power is a significant technical problem of the built-in camera type VTR that should be solved.

OBJECTS AND SUMMARY OF THE INVENTION

Accordingly, it is a general object of this invention to provide an improved video tape recorder having a built-in camera.

An object of this invention is to provide an improved power control circuit for a color encoder of a video camera.

Another object of this invention is to provide a power control circuit for a color encoder of a video camera in which when external output terminals are not terminated by a video tape recorder and the like, this state is automatically judged and the power supply to the color encoder is switched off so that the power consumption of the color encoder can be reduced considerably as compared with the prior art.

Further object of this invention is to provide a power control circuit for a color encoder of a video camera which can considerably reduce the whole power consumption of a video tape recorder having a built-in camera.

According to one aspect of the present invention, there is provided a control circuit for a power switch which is used to open and close the power path of a color encoder of a video camera. A level of a synchronizing signal superimposed upon a video signal developed at external output terminals is compared with a reference level by a comparator. Then, on the basis of a compared output, which results from comparing the level of the synchronizing signal obtained when the external output terminals are not terminated, the above mentioned power switch is periodically turned off (opened). When the external output terminals are terminated by a video tape recorder and the like, this power switch is turned on (closed) automatically.

With this circuit arrangement, when the external output terminals are not terminated (when the levels at the external output terminals are smaller than the reference level), the compared output becomes a positive pulse of a horizontal period or a high level (a predetermined DC level). Whereas, when they are terminated, the levels at the external output terminals of the synchronizing signal becomes larger than the reference level so that the compared output becomes a low level.

Accordingly, if this compared output if supplied to a judging logic circuit, depending on whether or not the video tape recorder is connected to the external output terminals, the logical operation of the logic circuit becomes different so that the presence or absence of the termination of the external output terminals can be checked easily. Thus, if the power switch is controlled on the basis of the output derived from this logic circuit, it becomes possible to selectively supply a predetermined operation power to the color encoder only when the external output terminals are terminated. As a result, it becomes possible to reduce the power that the color encoder itself consumes, accordingly, the whole power consumption of the video tape recorder having a built-in camera considerably.

When the external output terminals are not terminated, the power switch is repeatedly turned on and off periodically and the presence or absence of the termination is judged at every predetermined period.

These and other objects, features and advantages of the present invention will become apparent from the following detailed description of the preferred embodiments taken in conjunction with the accompanying drawings, throughout which like reference numerals designate like elements and parts.

BRIEF DESCRIPTION OF THE DRAWINGS

FIGS. 5A to 5C and FIG. 6 are waveform diagrams respectively used to explain the operation of the video tape recorder shown in FIG. 4;

FIG. 7 is a diagrammatical representation used to explain the controlled state of a power switch used in this invention;

FIG. 8 is a systematic block diagram showing other embodiment of this invention;

FIG. 9 is a systematic block diagram showing further embodiment of this invention; and FIG. 10 is a diagrammatical representation used to explain the detection operation for detecting whether or not external output terminals are terminated.

DESCRIPTION OF THE PREFERRED EMBODIMENTS

Figure 1A:
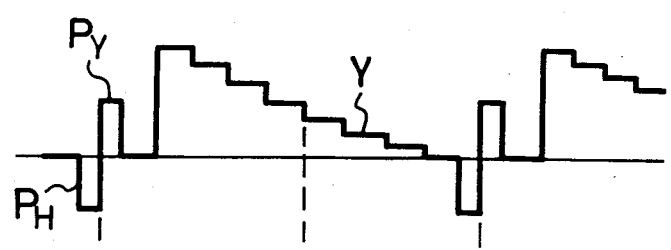
FIGS. 1A and 1B are explanatory diagrams of a recording system used to explain the present invention, respectively.
Figure 1B:
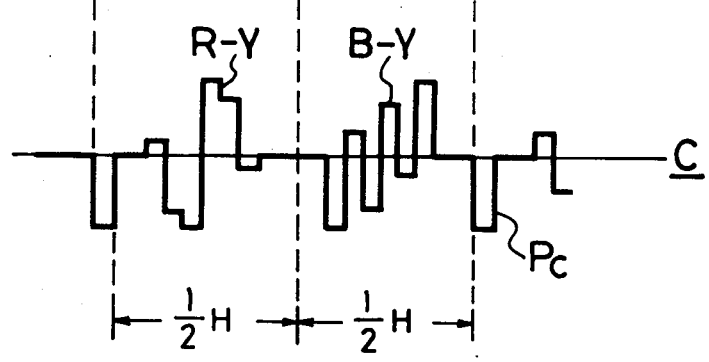
Figure 2:
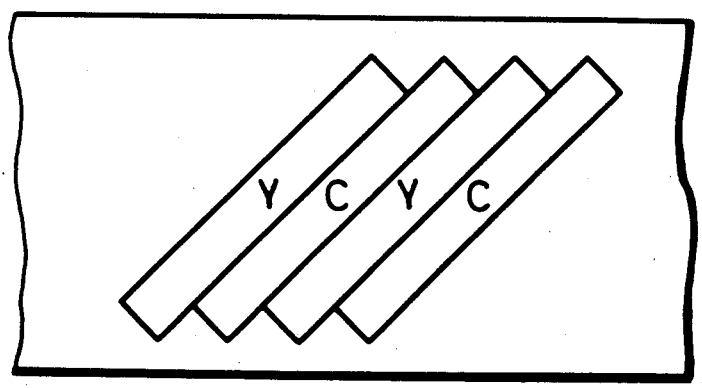
FIG. 2 is a diagram of a track pattern used to explain the above mentioned recording system.

Referring now to the drawings, the present invention will be described in detail hereinafter.

Figure 3:
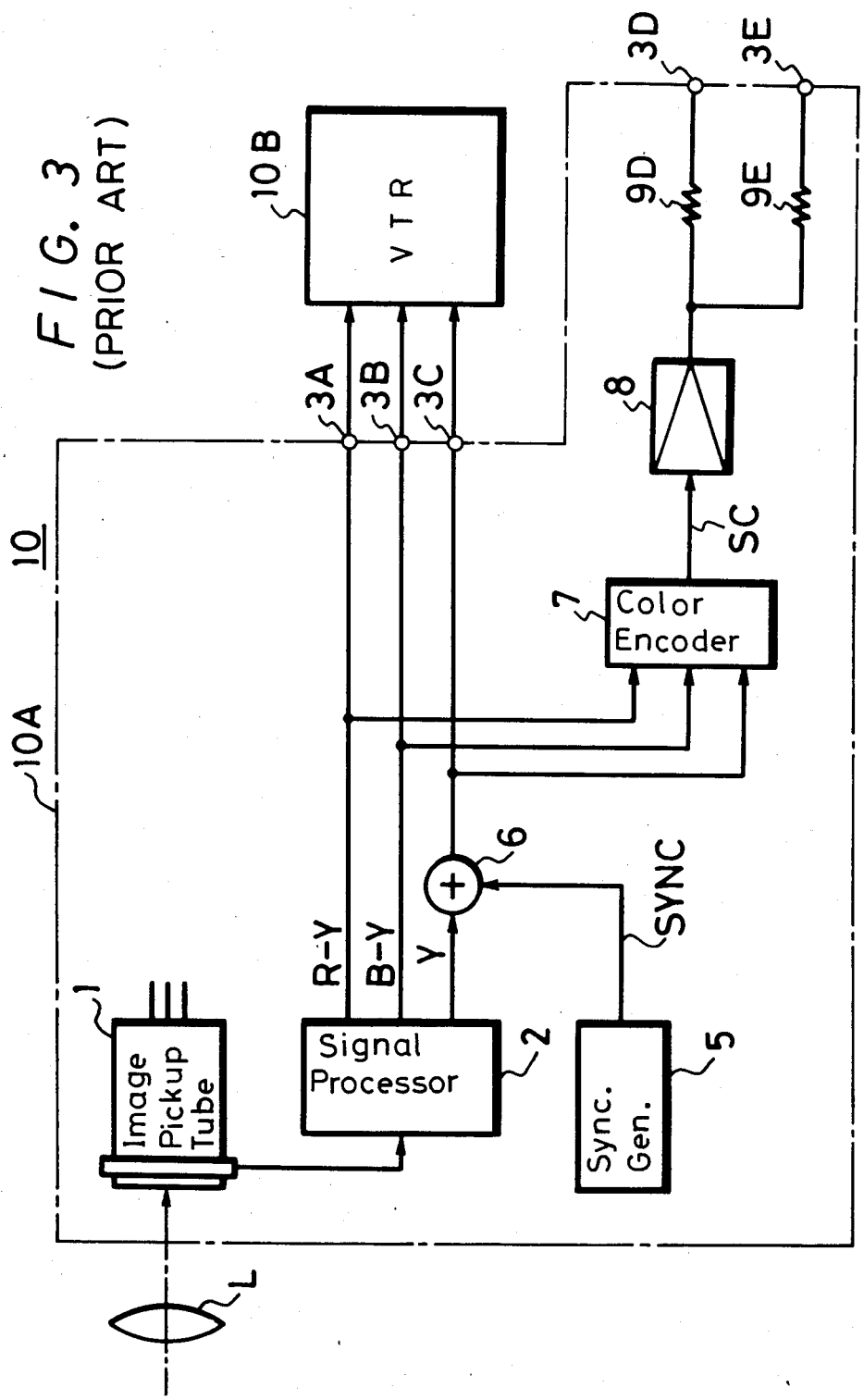
FIG. 3 is a systematic block diagram showing one example of a prior art video tape recorder having a built-in camera.
Figure 4:
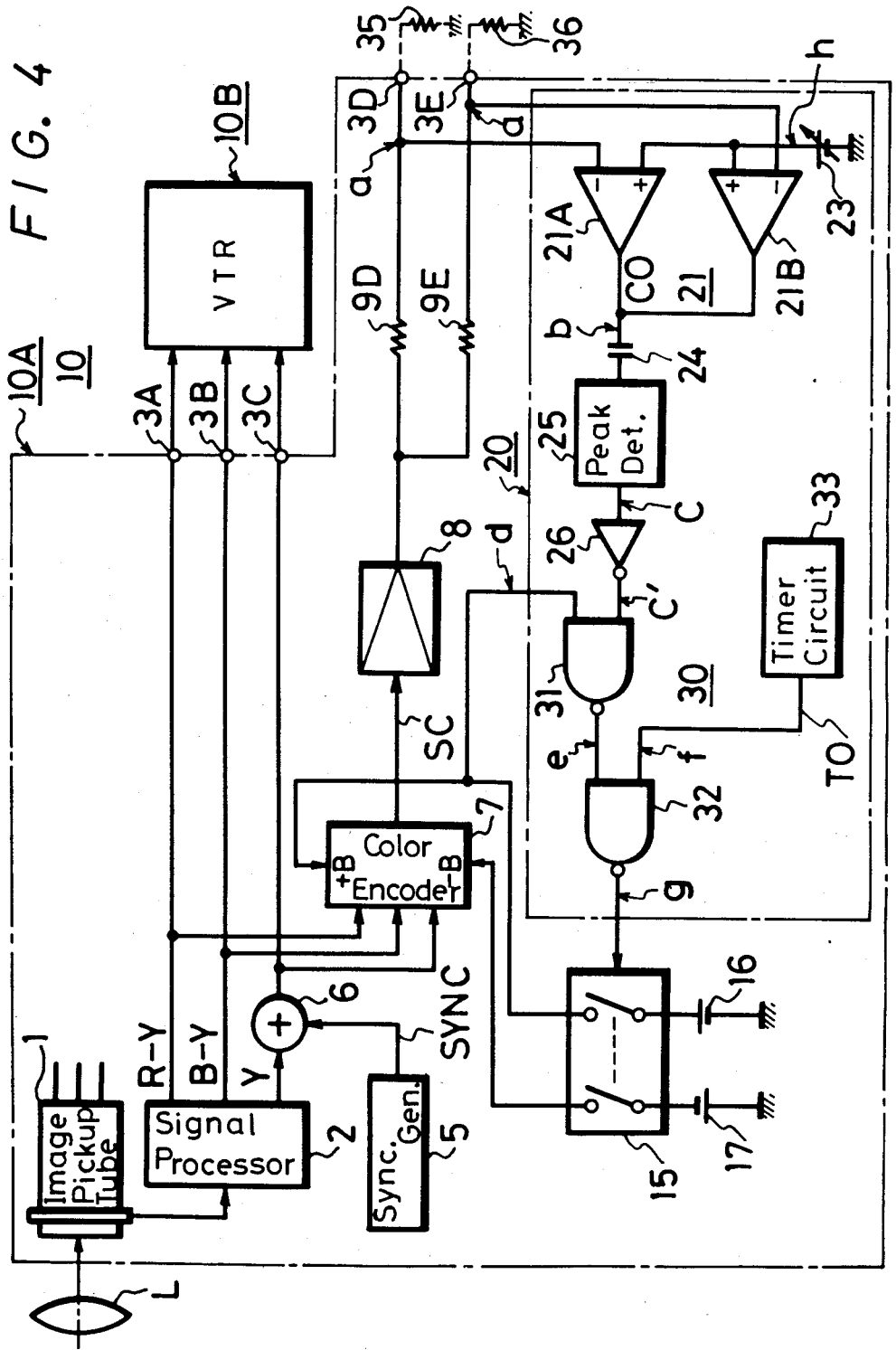
FIG. 4 is a systematic block diagram showing a main portion of one embodiment of a video tape recorder having a built-in camera to which the present invention is applied.

FIG. 4 shows a main portion of one embodiment of a video tape recorder having a built-in camera to which the present invention is applied. In FIG. 4, like parts corresponding to those of FIG. 3 are marked with the same references and will not be described.

As seen in FIG. 4, the color encoder 7 is provided with a power switch 15 which is used to control the power supply to the color encoder 7. In this embodiment, since the color encoder 7 is operated in a two-power system, the power switch 15 is connected with a positive power source 16 and a negative power source 17. The power paths of the positive and negative power sources 16 and 17 are controlled by the power switch 15 simultaneously.

The power switch 15 is controlled by an output from a control circuit 20. The control circuit 20 is provided with a level comparator 21. In this embodiment, since there are provided external output terminals for two channels, the level comparator 21 is formed of a pair of comparators 21A and 21B. The video signal SC developed at the external output terminal 3D is supplied to an inverting input terminal of the comparator 21A, while the video signal SC developed at the other external output terminal 3E same as that described above is supplied to an inverting input terminal of another comparator 21B. A power from a reference power source 23 is supplied commonly to both of non-inverting input terminals of the comparators 21A and 21B.

The compared output from the level comparator 21 is supplied through a coupling capacitor 24, which is used to cut off a DC component, to a peak detecting circuit 25 and thereby peak-rectified. The rectified output from the peak detecting circuit 25 is supplied through an inverter 26 to a first NAND circuit 31 which forms a part of a logic circuit 30. To the first NAND circuit 31, there is further supplied the positive voltage which is supplied to the color encoder 7.

The output from the first NAND circuit 31 is supplied to a second NAND circuit 32. The second NAND circuit 32 is supplied with a timer output pulse TO having a predetermined period derived from a timer circuit 33. The output from the second NAND circuit 32 is supplied to the power switch 15 as a control pulse.

When the video tape recorder having a built-in camera 10 is constructed as described above, in response to the terminated or not terminated state of the external output terminals 3D and 3E, the control circuit 20 generates a control pulse which will be stated below.

When either of or both of the external output terminals 3D and 3E are terminated, these output terminals are terminated by loads or resistors 35 and 36 each having a resistance value of 75 Ω, so that the video signal SC (whose waveform is shown in FIG. 5A) developed at a point a is divided in voltage by the resistors 9D and 35 or resistors 9E and 36. Hence, the level thereof is lowered such that the whole signal is decreased by a factor of ½ (see FIG. 5B). By this change of the level, it is possible to check whether or not the external output terminals 3D and 3E are terminated. To this end, a level (reference level) REF of the reference power source 23 for the comparator 21 is set to be a predetermined DC level larger than the synchronizing level when the external output terminals 3D and 3E are not terminated but which is smaller than the synchronizing level when they are terminated as shown by one-dot chain lines in FIGS. 5A and 5B.

The timer circuit 33 is used, as will be described later, to turn on and off the power switch 15 at a predetermined period in order to detect the change of the external output terminals 3D and 3E from the not terminated state to the terminated state. As shown, for example, in FIG. 6, a period T2 in which the timer output pulse TO of the timer circuit 33 is at high level is set longer than its low level period T1. In this embodiment, the low level period T1 is set as one second and the high level period T2 as three seconds, respectively.

Let it be assumed that this timer output pulse TO be generated at every predetermined period as described above during a period in which the main power source of the built-in camera type VTR 10 is being switched on.

By the way, when the power switch 15 is turned on and the color encoder 7 is in the operative state, accordingly, when either of the external output terminals 3D and 3E, for example, the terminal 3D is terminated, the signal level at the point a is ½ the signal level provided when the external output terminals 3D and 3E are not terminated. As a result, under this state, the signal level at the point a and the reference level, accordingly, the signal level at a point g are placed in such a relationship as shown in FIG. 7. Hence, the level of a compared output CO at a point b is "L" (low), the level of the rectified output (output at a point c) is "L" and the signal level at a point c′ becomes "H" (high).

On the other hand, since the power switch 15 is turned on, the signal level at a point d becomes "H", whereby the signal level at a point e where the output of the first NAND circuit 31 is obtained becomes "L". Accordingly, the signal level at the point g at which the output of the second NAND circuit 32 is derived becomes "H" regardless of the timer output pulse TO (output developed at a point f) with the result that the power switch 15 remains turned on.

In FIG. 7, the level relationships established when the external output terminals 3D and 3E are terminated and are not terminated are indicated over upper and lower stages. This indicates the modes of the period T1 in which the timer output pulse TO is at level "L" and of the period T2 in which it is at level "H". The upper stage indicates the periods in which the timer output pulse TO is at level "L".

Now, let it be assumed that during the operation period of the color encoder 7, the external output terminal 3D, for example, not be terminated. Then, the signal level at the point a is returned to the normal level and the level relationship to the reference level REF is reversed to the above mentioned one only during the period of the synchronizing signal. Thus, the compared output CO shown in FIG. 5C is generated from the level comparator 21. Since this compared output CO is detected in peak level, or peak-rectified, the signal level at the point c becomes "H" so that the signal level at the point c′ is inverted to "L". At that time, since the power switch 15 still remains turned on, the signal level at a point e becomes "H". When the output from the first NAND circuit 31 is inverted to "H", during the period T1 in which the level of the timer output pulse TO is "L", the signal level at the point g remains as it is ("H"), while during the period T2 in which the timer output pulse TO is inverted to "L", the signal level at the point g becomes "L". Thus, the power switch 15 is turned off.

When the external output terminals 3D and 3E are not terminated, the power switch 15 is not always turned off but alternately is turned on and off at the period of the timer output pulse TO. Specifically, under the state that the power switch 15 is turned off, the color encoder 7 does not generate the video signal SC and the compared output CO becomes the predetermined DC level (positive level). Since the peak rectifying or detecting circuit 25 is adapted to peak-rectify the compared output CO whose DC component is cut off by the capacitor 24, in this case, the peak-rectified or detected output becomes "L". Also, since the signal level at the point d is "L", the signal level at the point e becomes "H". Thereafter, the power switch 15 is controlled similarly as described above and during the period T2, the power switch 15 remains turned off. The power switch 15 is therefore turned on and off at the period of the timer output pulse TO.

The reason that when the external output terminals 3D and 3E are not terminated, the power switch 15 is turned on and off at the predetermined period will be described below.

That is, when the power switch 15 is not controlled by an output, which results from logically calculating the timer output pulse TO and the output of the first NAND circuit 31 in a NAND fashion, in other words, when the timer circuit 33 is not provided and the power switch 15 is controlled directly by the output (output developed at the point e) of the first NAND circuit 31, as will be clear from FIG. 7, if the state of the external output terminals 3D and 3E are changed from the terminated state to the not terminated state, the signal level of the output from the first NAND circuit 31 is also changed from "L" to "H". Accordingly, if the power switch 15 is turned on when the output of the first NAND circuit 31 is at "L", when the external output terminals 3D and 3E are not terminated, the power switch 15 is turned off so that the power switch of the color encoder 7 can be switched off.

However, when the external output terminals 3D and 3E are changed from this not terminated state to the terminated state, the power switch 15 is always placed in its OFF state so that the video signal is not generated and thus the synchronizing signal can not be detected. Accordingly, when the external output terminals 3D and 3E are terminated, the power switch 15 can not be turned on automatically.

On the contrary, if the timer output pulse TO is utilized as described above, even though the power switch 15 is turned off, when the timer output pulse TO becomes "H", the power switch 15 is automatically turned on only during the period T1. Accordingly, if the video signal SC is generated from the color encoder 7 during the on-period or the period T1, and the external output terminals 3D and 3E are terminated, the signal level at the point b becomes "L" so that regardless of the polarity of the timer output pulse TO, the output of the second NAND circuit 32 becomes "H". Thus, the power switch 15 can be turned on automatically.

For this reason, the power switch 15 is turned on and off periodically.

The duration of pulse and the period of the timer output pulse TO during the periods T1 and T2 are determined on the basis of the following reasons. When the duration of the period T2 (period in which the power switch 15 is turned off) is too long, even if the external output terminals 3D and 3E are terminated during this duration of period, the power switch 15 is not turned on till the next period T1. There is then a possibility that the user will mistake this state as a trouble. Therefore, it is not preferable that the period be selected to be too long in duration.

Another period T1 (period in which the power switch 15 is turned on) is set as a period having a time period long enough to detect the synchronizing signal of the video signal SC and to positively turn off the power switch 15.

When the periods T1 and T2 of the timer output pulse TO are determined as described above, the power consumed by the color encoder 7 when the external output terminals 3D and 3E are not terminated becomes ¼. However, the periods T1 and T2 are determined as described above by way of example. Accordingly, so long as the time period of the period T2 is not determined too long as mentioned before, it is possible to determine the periods T1 and T2 at other periods than those shown in FIG. 6.

FIG. 8 shows another embodiment of this invention. In this embodiment, the video tape recorder having a built-in camera 10 is constructed without the timer circuit 33. Therefore, in accordance with this embodiment shown in Fig. 8, the adder 6 for adding the synchronizing signals is located after the amplifier 8. In the adder 6, the synchronizing signal SYNC is added and thereby the composite video signal SC is generated. Since the amplifier 8 is continuously powered regardless of whether or not the external output terminals 3D and 3E are terminated, even if the power supply to the color encoder 7 is switched off, only the synchronizing signal can be obtained at the point a. For this reason, without the timer circuit 33 and the second NAND circuit 32, it becomes possible to positively detect whether or not the external output terminals 3D and 3E are terminated. In this embodiment, the circuit 31 may be an AND circuit.

In this case, one period in which the power switch 15 is turned on and off when the external output terminals 3D and 3E are not terminated becomes the horizontal period so that the power switch 15 is turned on during the period of the horizontal synchronizing signal and turned off during other periods.

According to the circuit arrangement of this invention as set forth above, depending on the magnitude of the level of the synchronizing signal contained in the video signal SC developed at the external output terminals 3D and 3E, it can be judged automatically whether or not the external output terminals 3D and 3E are terminated and the power switch 15 provided in the power path of the color encoder 7 can be turned on and off, so that if the external output terminals 3D and 3E are not terminated, it is possible to positively cut off the power supply to the color encoder 7 at the constant period. As a result, the power consumption of the color encoder 7 can be reduced considerably and power consumption of the whole of the video tape recorder having a built-in camera can be reduced considerably as compared with the prior art one.

Further, since the circuit arrangement necessary for controlling the power source is relatively simple, the present invention is very advantageous in practical use because of practical advantages such as to construct the control system of this kind at low cost and so on.

In the first embodimennt shown in FIG. 4, during the period in which the timer circuit 33 is turned on, the color encoder 7 consumes the power and hence the effect to reduce the power does not become so effective as is expected. Further, in the second embodiment shown in FIG. 8, the delay of signal is produced by the chrominance signal processing at the color encoder 7 so that a special phase adjusting system for adjusting the delay time relative to the output of the color encoder 7 must be provided in a synchronizing signal system and further, it is required to provide an extra circuit for detecting whether or not the external output terminals 3D and 3E are terminated.

FIG. 9 shows a third embodiment of this invention which can remove the above defects encountered with the preceding first and second embodiments. In FIG. 9, like parts corresponding to those of FIGS. 4 and 8 are marked with the same reference and will not be described.

Referring to FIG. 9, at the rear stage of the color encoder 7, there is provided a DC offset voltage superposing circuit 40. This DC offset voltage superposing circuit 40 is provided with a voltage adding circuit 41. This voltage adding circuit 41 is supplied with the video signal SC derived from the color encoder 7 and also with a predetermined DC voltage through a pair of resistors R1 and R2 which are connected in series from a power supply terminal 42. In this embodiment, the voltage adding circuit 41 is supplied with a DC offset voltage of 0.6 Volt.

A switching transistor Q is connected between the resistor R2 and the ground. When the external output terminals 3D and 3E are not terminated, this switching transistor Q is turned off by the output of the inverter 26 so that the DC offset voltage is superimposed upon the video signal SC.

Since the plurality of external output terminals 3D and 3E are led out, the amplifier 8 is constructed as a distributing inverting amplifier (video output amplifier). The amplifier 8 is always powered by a predetermined voltage.

The outputs developed at the external output terminals 3D and 3E are supplied respectively through resistors R3 and R4 (each resistance value is about 20 KΩ) to the control circuit 20.

The control circuit 20 is constructed in nearly the same way as the control circuit 20 shown in FIG. 4, and the reference voltage for the level comparator 21 is determined similarly. The output from the inverter 26 is supplied to the transistor Q as the control signal and also supplied through a delay circuit 45 and an inverter 46 to the power switch 15 as its control signal.

The delay circuit 45 is formed of a time constant circuit of a resistor 45a and a capacitor 45b and the delay time τ thereof is selected as about 0.15 to 0.2 seconds.

The operation to detect the terminated state and the not terminated state of the external output terminals 3D and 3E when the video tape recorder having a built-in camera is constructed as described above will be described with reference to FIG. 10.

First, for convenience sake of explanation, the signal level developed at the point a is determined as follows.

As shown in FIG. 5, the pedestal level is determined as a DC zero Volt, a sync. chip level of the horizontal synchronizing pulse is determined as −0.6 Volt and the white level is determined at 1.4 Volt, respectively. When the external output terminals 3D and 3E are not terminated, the signal level is not divided in voltage so that the signal is developed at the point a with the above mentioned level relationship. When the terminals 3D and 3E are terminated, the signal level is divided to ½ in voltage and then delivered.

When the power switch 15 is turned on and the color encoder 7 is in the operative state, and accordingly, when either of the external output terminals 3D and 3E, for example, the terminal 3D is terminated (in the state I in FIG. 10), as will be described later, the DC offset voltage is not superimposed upon the video signal SC. In this case, since such relation is placed in a relation similar to that shown in FIG. 5B, the compared output (signal level at the point b) becomes "L" and the signal level of the output (the signal level at the point c') from the inverter 26 becomes "H" so that the transistor Q is turned on.

As a result, since the power source terminal 42 is grounded via the resistor R1, the DC offset voltage is not superimposed upon the video signal SC. Further, by the output from the inverter 46, the power switch 15 is kept turned on.

Under this state, if the external output terminal 3D is not terminated (state II in FIG. 10), with respect to the signal level at the point a, only the synchronizing signal level thereof is returned to the original level so that the input level relationship to the level comparator 21 becomes the same as that shown in FIG. 5A. Thus, the compared output becomes "H" only during the synchronizing pulse interval and thereby the positive pulse CO shown in FIG. 5C is generated. This positive pulse CO is peak-rectified by the peak rectifying circuit 25 and the rectified pulse is inverted in polarity so that the signal level at the point c' is inverted to "L". As a result, the transistor Q is turned off.

When the transistor Q is turned off, the predetermined DC offset voltage is superimposed upon the video signal SC.

Since the power switch 15 is controlled with a delay of a predetermined delay time because of the existence of the delay circuit 45, the power switch 15 is turned off for the first time at the state II' and the power supply to the color encoder 7 is stopped. Accordingly, until the power source for the color encoder 7 is turned off, the video signal SC is continuously supplied to the external output terminal 3D side. In addition, under this state, the DC offset voltage is superimposed upon the video signal SC so that the compared output is changed to the level "H".

However, as a result, the signal level is not changed at the point c'.

When the power switch 15 is turned off, the video signal SC is not generated anymore and the state III is presented. Under this state III, although only the negative DC offset voltage is supplied to the level comparator 21, the signal level thereof is below the reference level so that the compared output is not fluctuated.

Subsequently, under the state IV in which the external output terminal 3D is terminated again, only the DC offset voltage is divided to ½ so that the compared output is inverted to "L" and the signal level at the point c' is inverted to "H". Thus, the transistor Q is turned on and hence the DC offset voltage becomes zero. Until the predetermined time $\tau$ passes after the DC offset voltage becomes zero, the power switch 15 remains turned off. This is the state IV'.

Since in the state IV' no input is supplied to the level comparator 21, the controlled state of the power switch 15 is not changed.

After the time $\tau$ passes, the state IV' is changed to the state V. At that time, the external output terminal 3D is terminated so that the synchronizing pulse with the level divided to ½ is supplied to the level comparator 21. Accordingly, the compared output is not changed from that of the state IV' and hence the transistor Q remains turned on so that the power switch 15 remains turned on.

As mentioned above, on the basis of the level of the DC offset voltage, it is possible to detect the terminated state and the not terminated state of the external output terminals 3D and 3E. When the external output terminals 3D and 3E are not terminated, the power supply to the color encoder 7 is always turned off.

The reason that the output from the inverter 26 is not supplied directly to the power switch 15 but is supplied thereto with the predetermined delay time is that the actuation timings of the color encoder 7 and the amplifier 8 must be taken into consideration.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. A power control circuit for a color encoder of a video camera having a camera head portion, a signal processing circuit for generating a luminance signal and a chrominance signal, a color encoder supplied with said luminance signal and said chrominance signal and for generating a composite video signal, and an external output terminal at which said composite video signal is obtained, said power control circuit comprising:
   (a) power switch means for controlling the power supply to said color encoder;
   (b) comparator means connected to said external output terminal and for comparing the level of a synchronizing signal at said external output terminal and a reference level; and
   (c) a control circuit supplied with the output of said comparator means and for controlling said power switch means such that the power switch is turned on when said external output terminal is terminated.

2. A power control circuit according to claim 1, further comprising a video tape recorder for recording said luminance signal and chrominance signal simultaneously in separate channels.

3. A power control circuit according to claim 1, wherein said synchronizing signal is superimposed on the luminance signal at the output of said signal processing circuit.

4. A power control circuit according to claim 3, wherein said control circuit includes a timer circuit for generating a periodical pulse signal periodically turning on said power switch means when said external output terminal is not terminated.

5. A power control circuit according to claim 3, further including an offset DC voltage generator for generating an offset DC voltage when said external output terminal is not terminated, and said offset DC voltage is superimposed on the output of said color encoder.

6. A power control circuit according to claim 1, wherein said synchronizing signal is superimposed on the output signal of said color encoder.

7. A power control circuit according to claim 1, wherein said control circuit includes a coupling circuit connected to the output of said comparator means, a peak detector connected to said coupling circuit and a logic circuit connected to said peak detector.

* * * * *